March 12, 1935.  R. S. JOHNSTON  1,993,789
FERROUS WELDING ELECTRODE
Filed Oct. 28, 1932
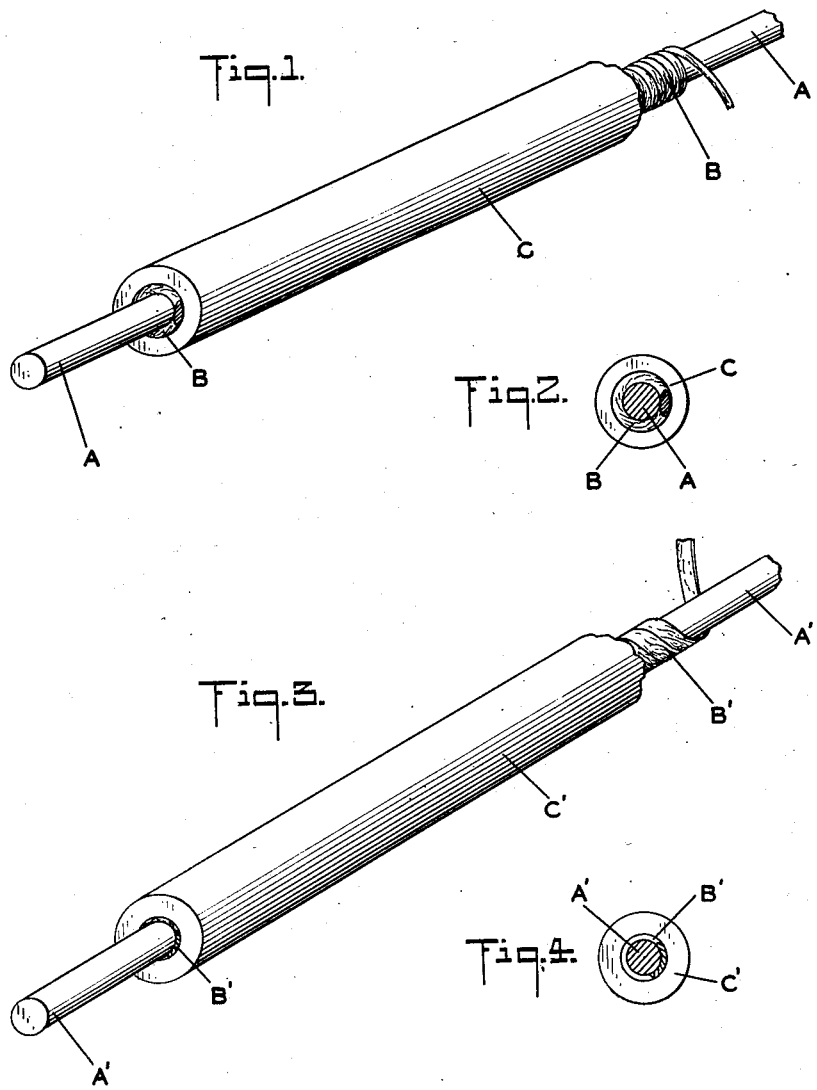
INVENTOR
Robert S. Johnston
BY Philip Sawyer
Rice + Kennedy
ATTORNEYS Patented Mar. 12, 1935

1,993,789

UNITED STATES PATENT OFFICE 1,993,789

FERROUS WELDING ELECTRODE

Robert S. Johnston, Yardley, Pa., assignor to John A. Roebling's Sons Company, Trenton, N. J., a corporation of New Jersey Application October 28, 1932, Serial No. 640,019

8 Claims. (Cl. 219—8)

This invention relates to a new coated ferrous welding electrode for arc-welding.

The object of the invention is to provide an electrode which will give a deposit of ferrous weld-metal having substantially the same composition, density and homogeneity as the metal of the welding rod and less hard, and therefore more like annealed metal, than has heretofore been the case with weld-metal, this difference in hardness being due to the superior heat insulating properties of the slag, as more fully explained hereinafter.

A further object of the invention is to provide a welding electrode which will accomplish the results set forth above without any increase of the operating voltage and most advantageously with a decrease in such voltage.

With the above objects in view and others which will be obvious to those skilled in the art from the description of the invention hereinafter, the invention broadly considered consists of a welding electrode having a rod of metal of substantially the same composition as that of the desired deposited weld-metal, and having a coating carried by the rod, said coating including ingredients for making a relatively light slag which is very fluid at the temperature to which it is subjected by the arc; which is neutral, that is, inert, with regard to interphase reactions between the molten weld-metal and the respective components of the slag; which has high thermal insulating properties, and which when setting has the properties of a blebby glass so as to maintain the insulating properties of the slag until the weld-metal has cooled and to give a brittle or friable coating which is easily removed when the weld is finished.

Such a coating is obtained by providing a composition which when in place on the electrode and under the action of the arc will melt at about the melting point of the weld-rod metal and form a eutectic slag.

Coated welding rods embodying the present invention are illustrated in the accompanying drawing in which:

Fig. 1 is an elevation partly broken away illustrating a welding rod having a fibrous asbestos wrapping next the rod.

Fig. 2 a cross section of the completed rod shown in Fig. 1.

Fig. 3 an elevation similar to Fig. 1 showing an asbestos paper wrapping next the rod and Fig. 4 a cross section of the completed rod shown in Fig. 3.

In the most advantageous embodiments of the invention the coating composition includes iron oxide, silica, and a further basic oxide, or material which when heated will give a basic oxide, for example, a manganese compound, which is either manganese oxide, or a compound which when heated or melted will produce manganese oxide, the latter type of compound being most advantageous. Instead of a manganese compound other compounds may be used such as those of titanium, vanadium, zirconium, or molybdenum which may be either oxides or in such form as to produce oxides when heated in the presence of the other ingredients.

It is very important that the components of the coating be in the proper proportions to form the eutectic slag and also there must be an additional ingredient serving as a flux and of such a nature and in such proportions as to make the slag very fluid when at the temperature attained in operation. Such a flux may be a potassium or a sodium compound, or a calcium or a barium compound.

It has been considered disadvantageous to employ barium as a constituent of the slag composition for an arc welding rod, although it has been recognized as advantageous because it tends to make the arc self-regulating. The serious disadvantage is that certain barium compounds, like the carbonates and oxides have toxic properties that could affect the operator when welding. However, it may be used in limited quantity in the slag composition of the present invention, without serious danger, because it tends to combine with the other ingredients of the slag to form a type of barium glass thereby losing most, if not all, its toxic properties. Usually, the barium would be employed only for rods for special purposes.

Where the composition selected is such as to form a ternary slag containing iron oxide, silica, and manganese oxide, with a flux, the properties of the ingredients are so selected that in the molten slag the relation by weight of the manganese oxide, the silica and the iron oxide will be substantially as follows:

| | Percent |
|---|---|
| MnO | 15 |
| Silica | 40 |
| $Fe_2O_3$ or $FeO.Fe_2O_3$ | 45 |

In a slag including the said three ingredients in about the proportions stated these will, when molten, form a ternary slag which is a eutectic and hence neutral or inert with regard to the molten weld metal. That is, there will be no tendency of the molten metal to take up any impurity from the slag, and no tendency of the slag to withdraw any ingredient from the molten metal, thereby protecting the weld-metal against any change in composition. In all cases the ternary compound is mixed with a flux in order to render the resulting slag very fluid, and whatever fluxing material is employed it should not contain any ingredients which will materially alter the ternary eutectic compound.

Instead of manganese oxide, titanium oxide may be used. In this case the relative percentage composition of the three ingredients should be such as to give in the molten slag

| | Percent |
|---|---|
| Iron oxide | 49 |
| Silica | 40 |
| Titanium oxide | 11 |

Where it is desired to obtain the best results, the composition is such that the manganese oxide is produced chiefly upon melting the slag, in which case the raw materials used in making the coating comprise a manganese compound which when heated by the arc will give the desired oxide. Such compounds as amorphous hydrates of manganese, or a carbonate of manganese are very advantageous, in which case the proportions in the composition are as follows:

| | Parts |
|---|---|
| Iron oxide | 25 |
| Silica | 40 |
| Manganese, in the form of an amorphous hydrate | 30 |

| | Parts |
|---|---|
| Iron oxide | 45 |
| Silica | 40 |
| Manganese carbonate | 24 |

In some cases the desired composition for the coating may be prepared in part from rock material or ore embodying some or all of the desired ingredients. For example, in order to make a coating containing iron oxide, silica and a manganese compound, the latter ingredient may be a selected psilomelane which consists chiefly of the hydrated manganese oxides $MnO_2$ and $MnO$, these being accompanied by some barium oxide which is highly advantageous as a flux. In some cases the ore may contain constituents other than those required but generally these are in such very small amounts as to be negligible, or such as will be of a basic nature so as to combine with the silica when heated and thus will not be affected by or affect the molten weld metal.

When using psilomelane as an ingredient of the coating composition it can be analyzed first and then the other ingredients, silica and iron oxide, added in the proper amounts to give the proportions of the ingredients necessary to produce the eutectic slag. Of course, in most cases the barium oxide in the psilomelane is not present in sufficient amount to satisfy the requirements of this invention as to the necessary flux content to make a very fluid slag, wherefore it generally is necessary to add additional fluxing material such as an alkali or alkaline earth compound. The formula employing manganese in the form of an amorphous hydrate, given hereinbefore, may be followed when using psilomelane.

Instead of the amorphous hydrates or carbonates of manganese hereinbefore referred to, a suitable silicate of manganese, such, for example, as some of the natural minerals like Rhodonite, may be employed, allowance for the silica contained therein being made in determining the amount of silica to be added separately, the proportions of the ingredients being so selected as to give the eutectic slag of substantially the percentage composition hereinbefore recited.

In place of psilomelane or rhodonite, there are other natural minerals containing manganese which may be selected, if desired, such, for example, as rhodochrosite, a carbonate, pyrolusite, an oxide, manganese calcite, another carbonate and tephroite, another silicate. In using these minerals, it is, of course, obvious that they must be selected so as not to contain any appreciable amount of impurities which would injure the eutectic slag, for example, by materially raising the melting point of the composition.

Instead of employing psilomelane as explained above, there may be used ilmenite, a titanic iron ore comprising ferrous titanate. Although the titanate contains some iron, which will form an oxide when the molten slag is formed, it is usually not in sufficient quantity to satisfy the requirements. Therefore, in this case, in addition to the silica which is used as an ingredient, some further iron oxide must be added in sufficient amount to form the eutectic slag. As one example the following formula may be used:

| | Percent |
|---|---|
| Ilmenite | 24 |
| Silica | 40 |
| Iron oxide | 36 |

In the most advantageous embodiment of the invention, the weld-rod A, Fig. 1 or A', Fig. 3, is wrapped with a close winding of chrysotile asbestos, B, Fig. 1, or asbestos paper, B', Fig. 3, and the coating, C or C', is then applied to the wrapping in a plastic condition and allowed to dry. To make the plastic material, the ingredients are ground finely, sifted if necessary, and mixed with a suitable amount of silicate of soda or water glass to form a paste. In practice the water glass may be used to the extent of 5 to 25 percent of the total coating composition.

The arc welding-rod of the type hereinbefore described may be made readily by machinery, the weld-rod in long lengths being run through a mechanism which will wrap about it the fibrous asbestos or asbestos paper, and then through a suitable mechanism for extruding the plastic coating composition onto the wrapped rod, which is finally passed through a smoothing die to finish the outer coating and bring it to the predetermined size. However, instead of applying the coating by extrusion, it is more advantageous to apply it by dipping the rod into the coating composition and then drying the rods either in the open or in a dryer, it being unnecessary in this case to pass the rod through a smoothing die.

While the percentage composition of a eutectic slag is definite and should be adhered to for the best results, it is obvious that slight deviations therefrom can occur in commercial practice and are within the scope of the invention.

What is claimed is:

1. An arc welding electrode consisting of a weld rod having substantially the same composition as the weld metal to be deposited, said weld-rod carrying a slag-forming material consisting of a mixture including a flux, silica and two different metallic compounds which when heated by the arc will react with silica, the proportions of the silica and the two metallic compounds respectively being substantially such as to form when melted a ternary eutectic neutral slag inert as to interphase reactions between the molten weld-metal and the molten slag, the flux being about 5 to 25% of the total slag-forming material.

2. An arc-welding electrode consisting of a weld-rod having substantially the same composition as the weld-metal to be deposited, said weld-rod carrying a slag-forming material consisting of a mixture including a flux, silica, iron oxide and another metal compound which when heated will react with silica, said silica, iron oxide, and other metallic compound being in such proportions relative to each other as to form, when melted by the arc, a ternary eutectic neutral slag inert as to interphase reactions between the molten weld-metal and the molten slag, the flux including about 5 to 25% of an oxide of alkaline earth metal figured on the total composition, whereby a very fluid slag is produced.

3. An arc-welding electrode consisting of a weld-rod carrying slag-forming material consisting of a mixture including a flux, silica, iron oxide and a manganese compound which when heated will react with silica, said silica, iron oxide, and manganese compound being in the following proportions relative to each other:

Silica ------------------------------- 40%
Iron oxide --------------------------- 45%
Manganese compound to give ------ 15% MnO, when melted by the arc, whereby a ternary eutectic neutral slag inert as to interphase reactions between the molten weld-metal and the molten slag is produced, the flux including an alkaline-earth compound and being in such proportions relative to the other ingredients as to make the molten slag very fluid.

4. An arc-welding electrode consisting of a weld-rod carrying a slag-forming material consisting of a mixture including a flux, silica, iron oxide and a manganese compound which when heated will react with silica, said silica, iron oxide, and manganese compound being in the following proportions relative to each other:

Silica ------------------------------- 40%
Iron oxide --------------------------- 45%
Manganese compound to give ------- 15% MnO when melted by the arc, whereby a ternary eutectic neutral slag inert as to interphase reactions between the molten weld-metal and the molten slag is produced, the flux including an alkaline-earth compound in amount about 5 to 25 percent of the total of the coating ingredients so as to produce a very fluid molten slag.

5. An arc-welding electrode consisting of a weld-rod carrying a slag-forming material consisting of a mixture including a flux, silica, iron oxide and an amorphous manganese hydrate which when heated will form a manganese oxide, said silica, iron oxide, and manganese hydrate being in such proportions as to give when melted by the arc the following proportions relative to each other:

Percent
Silica ------------------------------- 40
Iron oxide --------------------------- 45
Manganese oxide---------------------- 15 whereby a ternary eutectic neutral slag is produced, the flux including about 5 to 25% of an oxide of an alkaline earth metal, figured on the total coating composition.

6. An arc-welding electrode consisting of a weld-rod carrying a slag-forming material consisting of a mixture including a flux, silica, iron oxide and an amorphous manganese hydrate which when heated will form a manganese oxide, said silica, iron oxide, and manganese hydrate being in such proportions as to give when melted by the arc the following proportions relative to each other:

Percent
Silica ------------------------------- 40
Iron oxide --------------------------- 45
Manganese oxide---------------------- 15 whereby a ternary eutectic neutral slag is produced, the flux including about 5 to 25% of barium oxide, figured on the total coating composition.

7. An arc-welding electrode consisting of a weld-rod carrying a slag-forming material consisting of a mixture including a flux, silica, iron oxide and a titanium compound which when heated will react with silica, said silica, iron oxide, and titanium compound being in the following proportions relative to each other:

Percent
Silica ------------------------------- 40
Iron oxide --------------------------- 49
Titanium compound to give 11 per cent $TiO_2$ when melted by the arc, whereby a ternary eutectic neutral slag inert as to interphase reactions between the molten weld-metal and the molten slug is produced, the flux including an alkaline-earth compound in amount about 5 to 25 percent of the total of the coating ingredients so as to produce a very fluid molten slag.

8. An arc-welding electrode consisting of a weld-rod having substantially the same composition as the weld-metal to be deposited by said weld-rod, said weld-rod carrying a slag-forming material consisting of a mixture including a flux, silica, iron oxide and another metallic basic oxide, the flux constituting about 5% of the total of flux, silica, iron oxide and other metallic basic oxide, the silica constituting 40% of the total of silica, iron oxide and other metallic basic oxide in the molten condition, the iron oxide being present in greater proportion than the other metallic basic oxide, the latter two ingredients being proportioned relative to each other and to the silica to form a ternary eutectic neutral slag.

ROBERT S. JOHNSTON.